United States Patent
Collier et al.

(10) Patent No.: US 11,572,863 B2
(45) Date of Patent: Feb. 7, 2023

(54) SPAR CAP CONFIGURATION FOR A JOINTED WIND TURBINE BLADE

(71) Applicant: General Electric Company, Schenectady, NY (US)

(72) Inventors: Andrew Ross Collier, Greenville, SC (US); Andrew Mitchell Rodwell, Greenville, SC (US); Scott Jacob Huth, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/288,448

(22) PCT Filed: Oct. 25, 2018

(86) PCT No.: PCT/US2018/057434
§ 371 (c)(1),
(2) Date: Apr. 23, 2021

(87) PCT Pub. No.: WO2020/086080
PCT Pub. Date: Apr. 30, 2020

(65) Prior Publication Data
US 2021/0381484 A1 Dec. 9, 2021

(51) Int. Cl.
*F03D 1/06* (2006.01)
(52) U.S. Cl.
CPC ...... *F03D 1/0675* (2013.01); *F05B 2240/302* (2013.01); *F05B 2280/6003* (2013.01)
(58) Field of Classification Search
CPC ............... F03D 1/0675; F03D 1/0683; F05B 2240/302; F05B 2280/6003
See application file for complete search history.

(56) References Cited

U.S. PATENT DOCUMENTS

| | | |
|---|---|---|
| 851,196 A | 4/1907 | Bevans et al. |
| 4,474,536 A | 10/1984 | Gougeon et al. |
| 4,643,646 A | 2/1987 | Hahn et al. |

(Continued)

FOREIGN PATENT DOCUMENTS

| | | |
|---|---|---|
| EP | 2186622 A1 | 5/2010 |
| EP | 3144526 A1 | 3/2017 |

(Continued)

OTHER PUBLICATIONS

PCT Search Report, dated Jul. 22, 2019.

*Primary Examiner* — Courtney D Heinle
*Assistant Examiner* — Sang K Kim
(74) *Attorney, Agent, or Firm* — Dority & Manning, P.A.

(57) ABSTRACT

A jointed wind turbine rotor blade includes a first blade segment and a second blade segment extending in opposite directions from a chord-wise joint line. Each of the first and second blade segments includes opposite spar caps. The first and second blade segments are connected at the chord-wise joint line by internal joint structure, wherein the joint structure is bonded to the opposite spar caps in at least the second blade segment. The spar caps in the second blade segment have a first section with a first chord-wise width that is unbonded to the joint structure and a second section with a second chord-wise width that is bonded to the joint structure. The second chord-wise width is greater than the first chord-wise width.

15 Claims, 3 Drawing Sheets

(56) References Cited

U.S. PATENT DOCUMENTS

| | | | |
|---|---|---|---|
| 4,732,542 A | 3/1988 | Hahn et al. | |
| 5,281,454 A | 1/1994 | Hanson | |
| 7,334,989 B2 | 2/2008 | Arelt | |
| 7,344,360 B2 | 3/2008 | Wetzel | |
| 7,901,188 B2 | 3/2011 | Llorente Gonzalez et al. | |
| 7,922,454 B1 * | 4/2011 | Riddell | F03D 80/30 |
| | | | 416/224 |
| 7,927,077 B2 | 4/2011 | Olson | |
| 7,997,874 B2 | 8/2011 | van der Bos | |
| 7,998,303 B2 | 8/2011 | Baehmann et al. | |
| 8,123,488 B2 | 2/2012 | Finnigan et al. | |
| 8,221,085 B2 * | 7/2012 | Livingston | B29C 66/54 |
| | | | 416/226 |
| 8,297,932 B2 | 10/2012 | Arocena De La Rua et al. | |
| 8,348,622 B2 | 1/2013 | Bech | |
| 8,356,982 B2 | 1/2013 | Petri Larrea et al. | |
| 8,376,713 B2 | 2/2013 | Kawasetsu et al. | |
| 8,388,316 B2 | 3/2013 | Arocena De La Rua et al. | |
| 8,517,689 B2 | 8/2013 | Kyriakides et al. | |
| 8,919,754 B2 | 12/2014 | Schibsbye | |
| 9,470,205 B2 * | 10/2016 | Liu | F03D 1/0675 |
| 9,669,589 B2 | 6/2017 | Zamora Rodriguez et al. | |
| 10,451,030 B2 * | 10/2019 | Hayden | F03D 1/0675 |
| 2007/0018049 A1 | 1/2007 | Stuhr | |
| 2007/0253824 A1 | 11/2007 | Eyb | |
| 2009/0116962 A1 | 5/2009 | Pedersen et al. | |
| 2009/0155084 A1 | 6/2009 | Livingston et al. | |
| 2009/0162208 A1 | 6/2009 | Zirin et al. | |
| 2010/0132884 A1 | 6/2010 | Baehmann et al. | |
| 2010/0215494 A1 | 8/2010 | Bech et al. | |
| 2010/0275551 A1 | 11/2010 | Hofmann | |
| 2010/0304170 A1 | 12/2010 | Frederiksen | |
| 2011/0052403 A1 | 3/2011 | Kawasetsu et al. | |
| 2011/0081247 A1 | 4/2011 | Hibbard | |
| 2011/0081248 A1 | 4/2011 | Hibbard | |
| 2011/0091326 A1 | 4/2011 | Hancock | |
| 2011/0158788 A1 | 6/2011 | Bech et al. | |
| 2011/0158806 A1 | 6/2011 | Arms et al. | |
| 2011/0229336 A1 | 9/2011 | Richter et al. | |
| 2012/0093627 A1 | 4/2012 | Christenson et al. | |
| 2012/0196079 A1 | 8/2012 | Brauers et al. | |
| 2012/0213642 A1 | 8/2012 | Wang et al. | |
| 2012/0269643 A1 | 10/2012 | Hibbard et al. | |
| 2012/0308396 A1 | 12/2012 | Hibbard | |
| 2013/0040151 A1 | 2/2013 | Jeromerajan et al. | |
| 2013/0064663 A1 | 3/2013 | Loth et al. | |
| 2013/0129518 A1 | 5/2013 | Hayden et al. | |
| 2013/0164133 A1 | 7/2013 | Grove-Nielsen | |
| 2013/0177433 A1 | 7/2013 | Fritz et al. | |
| 2013/0189112 A1 | 7/2013 | Hedges et al. | |
| 2013/0189114 A1 | 7/2013 | Jenzewski et al. | |
| 2013/0219718 A1 | 8/2013 | Busbey et al. | |
| 2013/0224032 A1 | 8/2013 | Busbey et al. | |
| 2013/0236307 A1 | 9/2013 | Stege | |
| 2013/0236321 A1 | 9/2013 | Olthoff | |
| 2014/0286780 A1 | 9/2014 | Lemos et al. | |
| 2015/0132137 A1 | 5/2015 | Humblot et al. | |
| 2015/0204200 A1 | 7/2015 | Eyb et al. | |
| 2015/0369211 A1 | 12/2015 | Merzhaeuser | |
| 2018/0051672 A1 | 2/2018 | Merzhaeuser et al. | |

FOREIGN PATENT DOCUMENTS

| | | |
|---|---|---|
| FR | 2710871 A1 | 4/1995 |
| GB | 2477847 A | 8/2011 |
| WO | WO2009/034291 A2 | 3/2009 |
| WO | WO2010/023299 A2 | 3/2010 |
| WO | WO2011/064553 A2 | 6/2011 |
| WO | WO2011/066279 A2 | 6/2011 |
| WO | WO2015/051803 A1 | 4/2015 |
| WO | WO2015/185066 A1 | 12/2015 |

* cited by examiner

SPAR CAP CONFIGURATION FOR A JOINTED WIND TURBINE BLADE

FIELD

The present subject matter relates generally to wind turbine rotor blades and, more particularly, to a modified spar cap configuration for a jointed wind turbine blade.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbine rotor blades generally include a body shell formed by two shell halves of a composite laminate material. The shell halves are generally manufactured using molding processes and then coupled together along the corresponding ends of the rotor blade. In general, the body shell is relatively lightweight and has structural properties (e.g., stiffness, buckling resistance, and strength) which are not configured to withstand the bending moments and other loads exerted on the rotor blade during operation.

In recent years, wind turbines for wind power generation have increased in size to achieve improvement in power generation efficiency and to increase the amount of power generation. Along with the increase in size of wind turbines for wind power generation, wind turbine rotor blades have also significantly increased in size (e.g., up to 55 meters in length), resulting in difficulties in integral manufacture as well as conveyance and transport of the blades to a site.

In this regard, the industry is developing sectional wind turbine rotor blades wherein separate blade segments are manufactured and transported to a site for assembly into a complete blade (a "jointed" blade). In certain constructions, the blade segments are joined together by a beam structure that extends span-wise from one blade segment into a receiving section of the other blade segment. Reference is made, for example, to US Patent Publication No. 2015/0369211, which describes a first blade segment with a span-wise extending beam structure that structurally connects with a receiving section in a second blade segment. The beam structure forms a portion of the internal support structure for the blade and includes a shear web connected with a suction side spar cap and a pressure side spar cap. Multiple bolt joints are used to connect the beam structure with the receiving section in the second blade segment, including a span-wise bolt on the end face of the beam and at least one chord-wise bolt through the beam structure spaced from the joint line between the blade segments.

The jointed blade configuration utilizing a spar beam and receiving section, as described above, imposes significant structural challenges, particularly in ensuring the structural integrity of the bonded joint without adding unnecessary weight to the blade or sacrificing structural integrity in other parts of the blade. The present invention addresses certain of these structural integrity issues at the bonded joint.

BRIEF DESCRIPTION

Aspects and advantages of the invention will be set forth in part in the following description, or may be obvious from the description, or may be learned through practice of the invention.

In one aspect, the present subject matter is directed to a jointed wind turbine rotor blade that includes a first blade segment and a second blade segment extending in opposite directions from a chord-wise joint line. One of the blade segments is a root-end segment and the other is a tip-end segment. Each of the first and second blade segments includes a spar structure with opposite spar caps fixed to the respective pressure and suction side shell members. The spar structure may be, for example, an I-beam configuration or a box-beam configuration. The first and second blade segments are connected at the chord-wise joint line by internal joint structure configured between the first and second blade segments, wherein the joint structure is bonded to the opposite spar caps in at least the second blade segment (denoted as "second" for reference only). The spar caps in the second blade segment are formed with a first section having a first chord-wise width over a span-wise length thereof that is unbonded to the connecting joint structure and with a second section having a second chord-wise width over an adjacent span-wise length that is bonded to the joint structure. The second chord-wise width is greater than the first chord-wise width. This unique configuration provides sufficient bonding surface area between the joint structure and the spar caps, thereby increasing the structural integrity of the joint at this critical location.

The joint structure that connects the blade segments can vary widely within the scope and spirit of the invention. In a particular embodiment, the joint structure includes a spar beam extending span-wise from first blade segment into a receiver configured in the second blade segment. The first blade segment may be a tip-end segment (closer to the blade tip) and the second blade segment may be a root-end segment (closer to the blade root). In another embodiment, the blade segments may be reversed such that the first blade segment is the root-end segment. The receiver is a female structure configured for sliding receipt of the spar beam and includes upper and lower spar surfaces bonded to the spar caps in the second blade segment along the second chord-wise width of the spar caps. The upper and lower spar surfaces may have a chord-wise width that essentially corresponds to (equals) the second chord-wise width. The receiver may be configured, for example, as an open-ended box-beam structure with webs interconnecting the upper and lower spar surfaces.

In a further embodiment, the jointed wind turbine blade may further include a span-wise extending transition section formed in the spar caps in the second blade segment where the first chord-wise width increases gradually to the second chord-wise width. The upper and lower spar surfaces of the receiver may be bonded to or unbonded to the spar caps along these transition sections.

In a still further embodiment, the spar caps in the second blade segment may have a reduced thickness along the second section as compared to a thickness along the first section. This reduced thickness allows for a taller spar beam and accommodates the thickness of the upper and lower spar surfaces. The reduced thickness may be constant along the second section of the spar caps. This embodiment may also include the span-wise transition section in the spar caps where the first chord-wise width increases gradually to the second chord-wise width, with the thickness decreasing gradually along the transition section to the reduced thickness at the second chord-wise width.

The spar caps in the second blade segment may be formed from the same continuous material along the entirety thereof, including the first and second sections having the first and second chord-wise width sections, respectively. In an alternate embodiment, the spar caps in the second blade segment are formed from a first material along the first section and from a second material along the second section, wherein a scarf joint is formed between the first material and the second material. For example, the first material may include pultruded rods or plates, and the second material may be a laminate of unidirectional fiber plies. This embodiment may further include the span-wise transition section in the spar caps where the first chord-wise width increases gradually to the second chord-wise width and the thickness of the spar caps decreases to the reduced thickness, wherein the scarf joint is adjacent to the transition section.

The present invention also encompasses a wind turbine having one or more of the jointed wind turbine blades as described herein.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
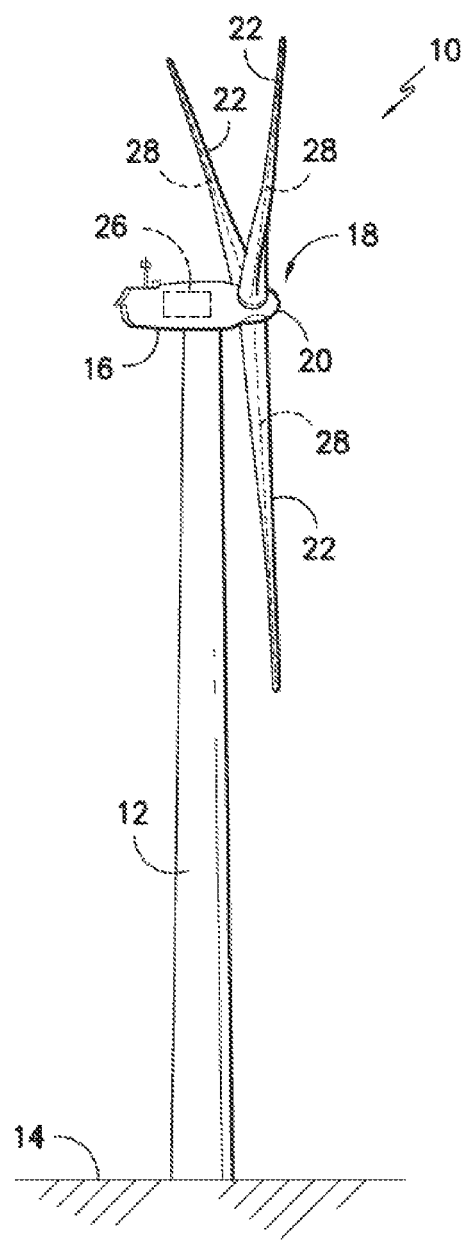
FIG. 1 illustrates a perspective view of a wind turbine that may utilize a jointed wind turbine blade according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to jointed wind turbine rotor blades having a modified spar cap configuration to accommodate joint structure that connects the segments of the jointed blade and provides increased structural integrity to bonded joint area of the blade. The invention also encompasses a wind turbine that utilizes one or more of the jointed wind turbine blades, as set forth herein.

Referring now to the drawings, FIG. 1 illustrates a perspective view of one embodiment of a wind turbine 10 that includes a tower 12 extending from a support surface 14, a nacelle 16 mounted on the tower 12, and a rotor 18 coupled to the nacelle 16. The rotor 18 includes a rotatable hub 20 and one or more rotor blades 22 coupled to and extending outwardly from the hub 20. The rotor blades 22 may be jointed blades in accordance with the present invention and are spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator positioned within the nacelle 16 to permit electrical energy to be produced.

The wind turbine 10 may also include a turbine control system or main controller 26 centralized within the nacelle 16. In general, the main controller 26 may comprise a computer or other suitable processing unit. Thus, in several embodiments, the main controller 26 may include suitable computer-readable instructions that, when implemented, configure the controller 26 to perform various different functions, such as receiving, transmitting and/or executing wind turbine control signals (e.g., pitch commands). As such, the main controller 26 may generally be configured to control the various operating modes (e.g., start-up or shutdown sequences) and/or components of the wind turbine 10. For example, the controller 26 may be configured to adjust the blade pitch or pitch angle of each rotor blade 22 (i.e., an angle that determines a perspective of the blade 22 with respect to the direction of the wind) about its pitch axis 28 via a pitch system in order to control the rotational speed of the rotor blade 22 as well as the loads acting on the rotor blade 22.

Figure 2:
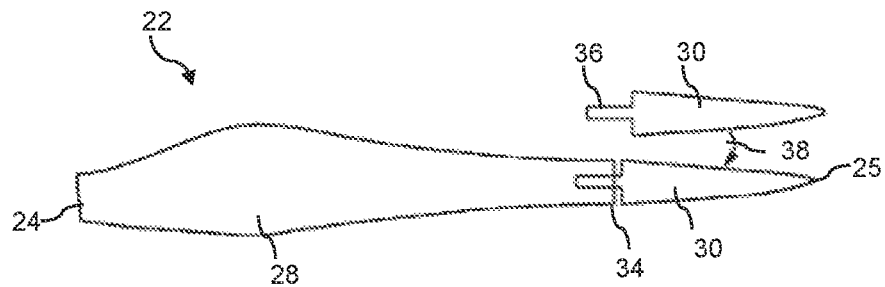
FIG. 2 illustrates a rotor blade having a first blade segment and a second blade segment, and joint structure that connects the blade segments.
Figure 3:
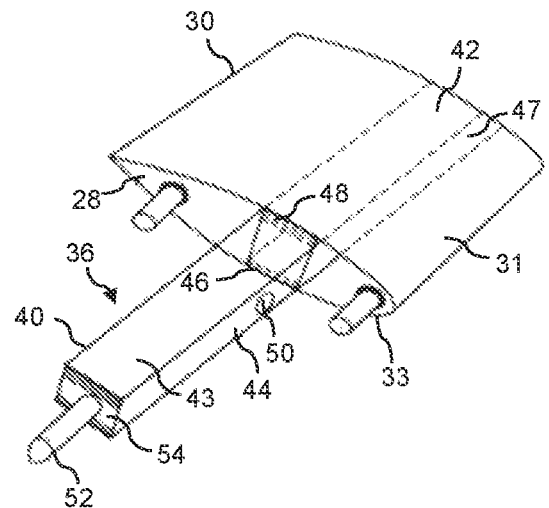
FIG. 3 is a perspective view of an embodiment of a first blade segment with joint structure.
Figure 4:
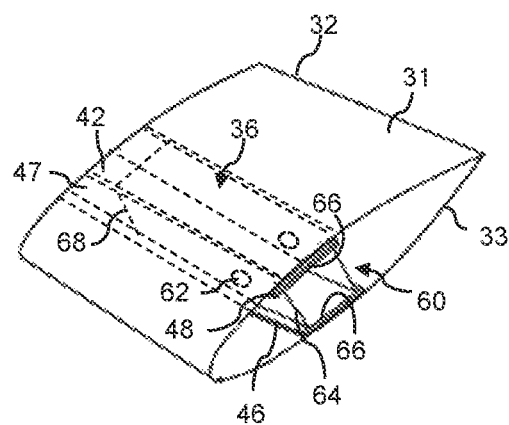
FIG. 4 is a perspective view of an embodiment of a second blade segment with complimentary joint structure.

Referring to FIGS. 2 through 4, a jointed rotor blade 22 is depicted having a first blade segment 30 and a second blade segment 32 that extend in opposite directions from a chord-wise joint line 34. Each of the blade segments 30, 32 includes a pressure side shell member 31 and a suction side shell member 33. The first blade segment 30 and the second blade segment 32 are connected by an internal joint structure 36 extending into both blade segments 30, 32 to facilitate joining of the blade segments 30, 32. The arrow 38 in FIG. 2 shows that the segmented rotor blade 28 in the illustrated example includes two blade segments 30, 32 and that these blade segments 30, 32 are joined by inserting the internal joint structure 36 of the first blade segment 30 into corresponding joint structure 36 configured in the second blade segment 32.

In the illustrated embodiment, the first blade segment 30 is a tip-end segment in that it is closest to the blade tip 25. The second blade segment 32 is a root-end segment in that it is closest to the blade root 24. It should be appreciated, however, that the "first" and "second" terms are used for reference, and that the blade segments 30, 32 are interchangeable. For example, the joint structure 36 of the first blade segment 30 (tip-end segment) may, in an alternate embodiment, be the joint structure 36 of the second blade segment 32 (root-end segment).

Each of the blade segments 30, 32 includes an internal spar structure 42 that typically includes opposite spar caps 46 (suction side spar cap) and 48 (pressure side spar cap) interconnected with one or more shear webs 47. For example, the spar structure may be a box-beam structure with the spar caps 46, 48 interconnected with spaced-apart shear webs 47, as depicted in FIGS. 2 and 3, or an I-beam structure wherein the spar caps 46, 48 are interconnected by a single shear web 47, as known to those skilled in the art.

In the depicted embodiment, the joint structure 36 of the first blade segment 30 includes a beam structure 40 ("spar beam") that extends lengthways (e.g., span-wise) beyond the chord-wise joint line 34 for structurally connecting with the internal support structure 36 in the second blade segment 32. The beam structure 40 may be integrally formed with the first blade segment 30 as an extension of the spar section 42, or may be a separately formed structure that is bonded to the spar section 42. The beam structure 40 may include at least one interconnecting web 44 (e.g., a shear web) connected with opposite spar surfaces 43. In the illustrated embodiments, the beam structure 40 is formed as a closed-ended box-type structure having opposite interconnecting webs 44 and opposite spar surfaces 43.

The first blade segment 30 may include one or more first bolt joints (also referred to as "pins") towards a first end 54 of the beam structure 40. For example, a bolt 52 may be located on the end 54 of the beam structure 40 and oriented in a span-wise direction. The first blade segment 30 may also include a bolt slot 50 located on the beam structure 40 proximate to the chord-wise joint 34 and oriented in a chord-wise direction for engagement with a chord-wise bolt (not illustrated) for the purpose of interconnecting the first 30 and second 32 blade segments.

In FIG. 4, the internal support structure 36 of the second blade segment 32 includes a receiver 60 extending span-wise within the second blade segment 32 for receiving the beam structure 40 of the first blade segment 30. The receiver 60 includes opposite spar surfaces 66 interconnected by one or more shear webs 64. For example, the receiver 60 may be an open-ended female box-beam structure with opposite spar surfaces 66 and opposite shear webs 64. The receiver may include a closed end face 68 that includes a bolt slot through which the bolt 52 on the spar beam 40 extends in a joined state of the blade segments 30, 32. Bolt slots 62 may be defined through the shear webs 64 that align with the bolt slots 50 in the spar beam, wherein a chord-wise bolt (not shown) extends through the bolt slots 62, 50 in the joined state of the blade segments 30, 32.

Figure 5:
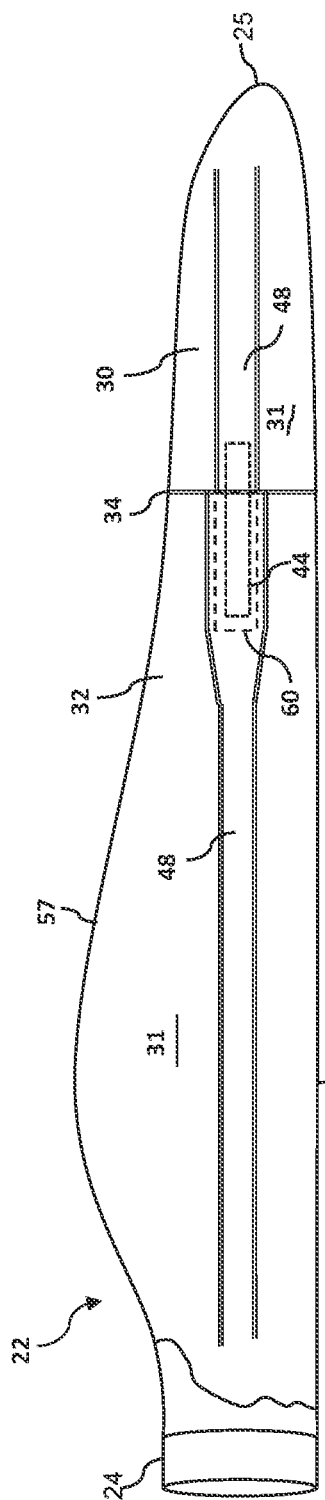
FIG. 5 is a top view of a jointed wind turbine blade in accordance with aspects of the present invention.
Figure 6:
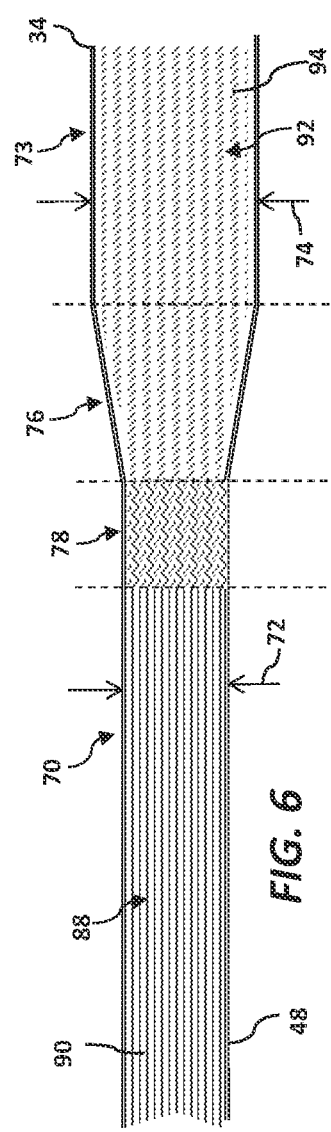
FIG. 6 is a top view of a segment of the spar caps in second blade segment of the jointed wind turbine blade of FIG. 5.
Figure 7:
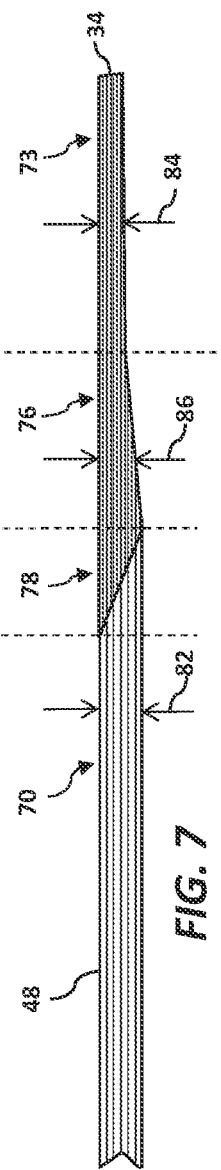
FIG. 7 is a side view of the spar cap segment of FIG. 6.

Referring to FIGS. 5 through 7, the spar caps 46, 48 in the second blade segment 32 are formed with a first section 70 having a first chord-wise width 72 along a span-wise length thereof that is unbonded to the connecting joint structure 36. The spar caps 46, 48 have a second section 73 with a second chord-wise width 74 over an adjacent span-wise length that is bonded to the joint structure 36. The second chord-wise width 74 is greater than the first chord-wise width 72. The amount of increased width will depend on a number of design and structural variables and can readily be determined by those skilled in the art. Generally, it has been found that an increase in width of at least 10% of the first chord-wise width is desirable. For example, the second chord-wise width 74 may be 30% greater than the first chord-wise width (or 1.3× the width 72 of the first section 73). This increased width section 73 presents a greater surface area for bonding with the joint structure 36, for example with the spar surfaces 66 of the receiver 60, thereby increasing the structural integrity of the joint at this critical location.

The upper and lower spar surfaces 66 may have a chord-wise width that essentially corresponds to (equals) the second chord-wise width 74. In other embodiments, the chord-wise width of the spar surfaces 66 may be less than the second chord-wise width 74.

The jointed wind turbine blade 22 may further include a span-wise extending transition section 76 formed in the spar caps 46, 48 in the second blade segment 32, as particularly seen in FIG. 6, where the first chord-wise width 72 increases gradually to the second chord-wise width 74. The upper and lower spar surfaces 66 of the receiver 60 may be unbonded to the spar caps 46, 48 along these transition sections.

It should be appreciated that the span-wise length of the transition section 76 will depend on the materials used and the structural requirements for the particular blade design. The span-wise length of the transition section 76 will define the rate of change from then width 72 of the first section 70 to the width 74 of the second section 73. In a particular embodiment, the length of the transition section 76 (and thus, the rate of change of the width) and the selection of materials along the transition section 76 are determined such that the spar cap maintains essentially consistent structural properties of stiffness, buckling resistance and strength along the transition section 76. Further, these properties may be essentially the same for the spar cap in the first section 70 and the second section 73. However, it should also be understood that the invention encompasses embodiments wherein the structural properties change along the transition section 76, as well as between the first section 70 and the second section 73.

In addition, in certain embodiments, the spar caps 46, 48 in the second blade segment 32 may have a reduced thickness 84 along the second section 73 as compared to a thickness 82 along the first section 70, as particularly seen in FIG. 7. This reduced thickness 84 allows for a taller spar beam 40 and accommodates the thickness of the upper and lower spar surfaces 66 of the receiver 60. The reduced thickness 84 may be constant along the second section 73. The reduction in thickness from the first thickness 82 to the second thickness 84 may be gradual along the transition section 76.

The spar caps 46, 48 in the second blade segment 32 may be formed from the same continuous material along the entirety thereof, including the first 70 and second 73 sections having the different chord-wise widths 72, 74. In an alternate embodiment depicted in FIGS. 6 and 7, the spar caps 46, 48 are formed from a first material 88 along the first section 70 and from a second material 92 along the second section 73. A scarf joint 78 may be formed between the first material 88 and the second material 92 adjacent to the transition section 76. For example, the first material may include pultruded rods or plates, and the second material may be a laminate of unidirectional fiber plies. These materials are well-known to those skilled in the art and a detailed explanation thereof is not necessary for purposes of the present disclosure.

Referring to FIG. 1, the present invention also encompasses a wind turbine 10 having one or more of the jointed wind turbine blades 22 as described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A jointed wind turbine rotor blade, comprising:
a first blade segment and a second blade segment extending in opposite directions from a chord-wise joint line;
each of the first and second blade segments comprising opposite spar caps;
the first and second blade segments connected at the chord-wise joint line by internal joint structure configured between the first and second blade segments, the joint structure bonded to the opposite spar caps in at least the second blade segment;
the spar caps in the second blade segment comprising a first section with a first chord-wise width, the first section aligned in a span-wise direction with a second section having a second chord-wise width, the second section bonded directly to the joint structure;
the second chord-wise width being greater than the first chord-wise width;
the spar caps in the second blade segment comprising a constant reduced thickness portion along the second section extending span-wise to the chord-wise joint line as compared to a thickness along the first section; and
wherein the second section is bonded directly to the joint structure along the second chord-wise width and constant reduced thickness portion of the second section.

2. The jointed wind turbine rotor blade as in claim 1, wherein the joint structure comprises a spar beam extending span-wise from first blade segment into a receiver configured in the second blade segment, the receiver comprising upper and lower spar surfaces bonded directly to the second section of the spar caps in the second blade segment.

3. The jointed wind turbine rotor blade as in claim 2, wherein the upper and lower spar surfaces of the receiver comprise a chord-wise width corresponding to the second chord-wise width.

4. The jointed wind turbine rotor blade as in claim 1, wherein the first blade segment is a tip-end blade segment and the second blade segment is a root-end blade segment.

5. The jointed wind turbine rotor blade as in claim 1, further comprising a span-wise transition section in the spar caps in the second blade segment where the first chord-wise width increases gradually to the second chord-wise width.

6. The jointed wind turbine rotor blade as in claim 5, wherein material used and a length of the span-wise transition section provide consistent structural properties to the spar cap along the span-wise transition section.

7. The jointed wind turbine rotor blade as in claim 5, wherein structural properties of the spar cap vary along the span-wise transition section.

8. The jointed wind turbine rotor blade as in claim 1, wherein the spar caps in the second blade segment are formed from a first material along the first section and are formed from a second material along the second section, and further comprising a scarf joint between the first material and the second material.

9. The jointed wind turbine rotor blade as in claim 8, further comprising a span-wise transition section in the spar caps in the second blade segment where the first chord-wise width increases gradually to the second chord-wise width and a thickness of the spar caps decreases to the reduced thickness, the scarf joint disposed adjacent to the transition section.

10. The jointed wind turbine rotor blade as in claim 8, wherein the first material comprises pultruded rods or plates, and the second material comprises unidirectional fiber plies.

11. The jointed wind turbine rotor blade as in claim 1, wherein the spar caps in the first and second blade segments are formed from any one or combination of pultruded rods or plates or unidirectional fiber plies.

12. The jointed wind turbine rotor blade as in claim 1, wherein the joint structure comprises a box-beam receiver with webs interconnecting the upper and lower surfaces.

13. The jointed wind turbine rotor blade as in claim 1, wherein the second chord-wise width is constant where the second section of the spar caps in the second blade segment are bonded directly to the joint structure.

14. A wind turbine, comprising one or more of the jointed wind turbine blades according to claim 1.

15. A jointed wind turbine rotor blade, comprising:
a first blade segment and a second blade segment extending in opposite directions from a chord-wise joint line;
each of the first and second blade segments comprising opposite spar caps;
the first and second blade segments connected at the chord-wise joint line by internal joint structure configured between the first and second blade segments, the joint structure bonded to the opposite spar caps in at least the second blade segment;
the spar caps in the second blade segment comprising a first section with a first chord-wise width, the first section aligned in a span-wise direction with a second section having a second chord-wise width, the second section bonded directly to the joint structure;
the second chord-wise width being greater than the first chord-wise width;
wherein the spar caps in the second blade segment comprise a reduced thickness along the second section as compared to a thickness along the first section; and
further comprising a span-wise transition section in the spar caps in the second blade segment where the first chord-wise width increases gradually to the second chord-wise width and a thickness of the spar caps decreases from the thickness of the first section to the reduced thickness of the second section.

* * * * *